Patented Aug. 16, 1938

2,127,476

UNITED STATES PATENT OFFICE 2,127,476

PRODUCTION OF QUATERNARY AMMONIUM BASES

Heinrich Ulrich and Ernst Ploetz, Ludwigshafen-on-the-Rhine, Germany, assignors to I. G. Farbenindustrie Aktiengesellschaft, Frankfort-on-the-Main, Germany No Drawing. Application April 22, 1936, Serial No. 75,858. In Germany May 4, 1935

5 Claims. (Cl. 260—583)

The present invention relates to new quaternary ammonium compounds and a process of producing same.

We have found that quaternary ammonium bases can be prepared in a very advantageous manner by causing alkylene oxides, especially ethylene oxide, to act in the presence of water on water-insoluble tertiary amines which contain at least one high molecular radicle. For example tertiary amines containing an aliphatic radicle having at least 8, advantageously at least 10, carbon atoms are suitable for the reaction. The quaternary bases may themselves be reacted in some cases with further amounts of ethylene oxide with the formation of condensation products. For example polyalkylene ether chains containing a terminal hydroxy group may thus be introduced into the molecule of the quaternary ammonium base.

The reaction is preferably carried out at temperatures up to about 100° C. although it is possible to employ also higher temperatures.

In many cases it is necessary to employ an excess of ethylene oxide or to allow ethylene oxide to react several times in order to effect complete conversion of the tertiary amine into the readily water-soluble quaternary ammonium bases or the condensation products of the latter with ethylene oxide.

The products obtainable according to this invention are soluble in water and have an alkaline reaction. They have great foaming and wetting power and are valuable assistants for the textile and related industries, for example as softening agents, as agents improving the fastness to water and washing of dyeings, as agents improving the affinity of fibres to dyestuffs or, together with reducing agents as stripping agents. They may also be used for disinfecting purposes.

The following examples will further illustrate the nature of this invention but the invention is not restricted to these examples. The parts are by weight.

Example 1

50 parts of ethylene oxide are led into a suspension of 213 parts of dimethyldodecylamine in 640 parts of water at from 50° to 60° C. while stirring vigorously. A clear viscous solution of dimethylhydroxyethyldodecyl ammonium hydroxide is obtained which has a strong alkaline reaction. Even an alcoholic solution of the product has an alkaline reaction towards phenolphthalein while the initial material has a neutral reaction in alcohol.

Example 2

1000 parts of a mixture of amines, each containing two methyl groups and an alkyl radicle which corresponds to the alcohols obtainable by the reduction of palm kernel oil fatty acids are suspended in 2000 parts of water. Into the resulting suspension there are led at from 50° to 60° C. 200 parts of ethylene oxide. The whole is allowed to settle and the aqueous solution is separated from the unconverted constituents of the water-insoluble amine. There are thus obtained 2300 parts of a viscous solution of:

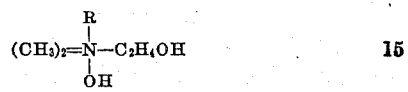

(in which R corresponds to the radicle above defined). About 43 per cent of the amine employed has been converted into quaternary base. The unchanged portion of amine may be converted into quaternary base by repeated treatment in the said manner.

Example 3

75 parts of dimethyloctodecylamine are suspended in 150 parts of water and caused to react at from 50° to 60° C. with 15 parts of ethylene oxide. When the reaction is completed, 100 parts of water and 15 parts of ethylene oxide are added. A jelly-like to solid mass is formed which forms an opalescent solution with 200 parts of water.

Example 4

107 parts of dimethyldodecylamine are suspended in 250 parts of water, 100 parts of ethylene oxide are then led into the suspension at from 50° to 60° C. The clear solution solidifies when cooled giving a gelatinous mass which is readily soluble in water. The product can be separated from its strongly alkaline solution neither by acids nor by alkalies.

Example 5

500 parts of the initial material specified in Example 2, 1000 parts of water and 500 parts of ethylene oxide are heated at from 70° to 80° C. in an autoclave. The mass removed from the autoclave while still hot solidifies to a brownish jelly readily soluble in water.

Example 6

250 parts of the initial material specified in Example 2, 500 parts of water and 450 parts of ethylene oxide are introduced at from 0° to 5° C. into an autoclave and stirred without external supply of heat. The temperature slowly rises to 90° C. The resulting product is a thick, brownish, syrupy, strongly alkaline reacting mass which is readily soluble in water.

If 20 or 30 molecular proportions of ethylene oxide are employed per each molecular proportion of the initial material similar products are obtained.

Example 7

108 parts of dimethyldodecylamine are dissolved in 345 parts of methanol; 17 parts of water and 30 parts of ethylene oxide are added and the mixture is treated in a closed vessel at 90° C. After from 1 to 2 hours all the ethylene oxide is absorbed. The methanol is evaporated in vacuo at 40° C. leaving behind an 88 per cent dimethylethanoldodecylammonium hydroxide as a readily water-soluble brownish syrupy mass.

Example 8

250 parts of a mixture of tertiary amines corresponding to the formula $(CH_3)_2=N-R$ (wherein R means the radicals of the alcohols obtainable by reducing the acids of palm kernel oil), 500 parts of methanol and 20 parts of water are heated in an autoclave at from 90° to 100° C. with 50 parts of ethylene oxide. As soon as the reaction is completed the methanol is evaporated in vacuo at 60° C., a mixture of compounds corresponding to the formula

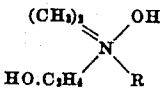

(wherein R has the meaning indicated above) is obtained in the theoretical yield in the form of a 78 percent syrupy readily water-soluble solution.

Example 9

250 parts of ethylene oxide are introduced at from 60° to 70° C. into a suspension of 157 parts of dimethyloctylamine in 720 parts of water while stirring vigorously. After separating the insoluble dimethyloctylamine which has not been attacked, a solution of polyethenoxy-dimethyloctyl-ammonium hydroxide is obtained.

The reaction may be carried out in a closed vessel.

What we claim is:

1. The process for the production of quaternary ammonium bases, which comprises causing ethylene oxide to act in the presence of water on a water-insoluble tertiary amine containing two low molecular aliphatic radicles and an open chain aliphatic radicle containing at least 8 carbon atoms.

2. The process for the production of quaternary ammonium bases, which comprises causing ethylene oxide to act in the presence of water on a water-insoluble tertiary amine containing two low molecular aliphatic radicles and an open chain aliphatic radicle containing at least 8 carbon atoms.

3. The process for the production of quaternary ammonium bases, which comprises causing ethylene oxide to act in the presence of water on a water-insoluble tertiary amine containing two low molecular aliphatic radicles and an open chain aliphatic radicle containing at least 8 carbon atoms.

4. The process for the production of quaternary ammonium bases, which comprises causing ethylene oxide to act at a temperature up to about 100° C. in the presence of water on a water-insoluble tertiary amine containing two low molecular aliphatic radicles and an open chain aliphatic radicle containing at least 8 carbon atoms.

5. A quaternary ammonium base derived from a water-insoluble tertiary amine containing 2 low molecular aliphatic radicals and an open-chain aliphatic radical with at least 8 carbon atoms and containing directly attached to the quaternary ammonium nitrogen atom a hydroxyl anion and a radical selected from the class consisting of ethylol radicals and polyethylene ether radicals containing a terminal hydroxy group.

HEINRICH ULRICH.
ERNEST PLOETZ.